United States Patent Office 2,925,546
Patented Feb. 16, 1960

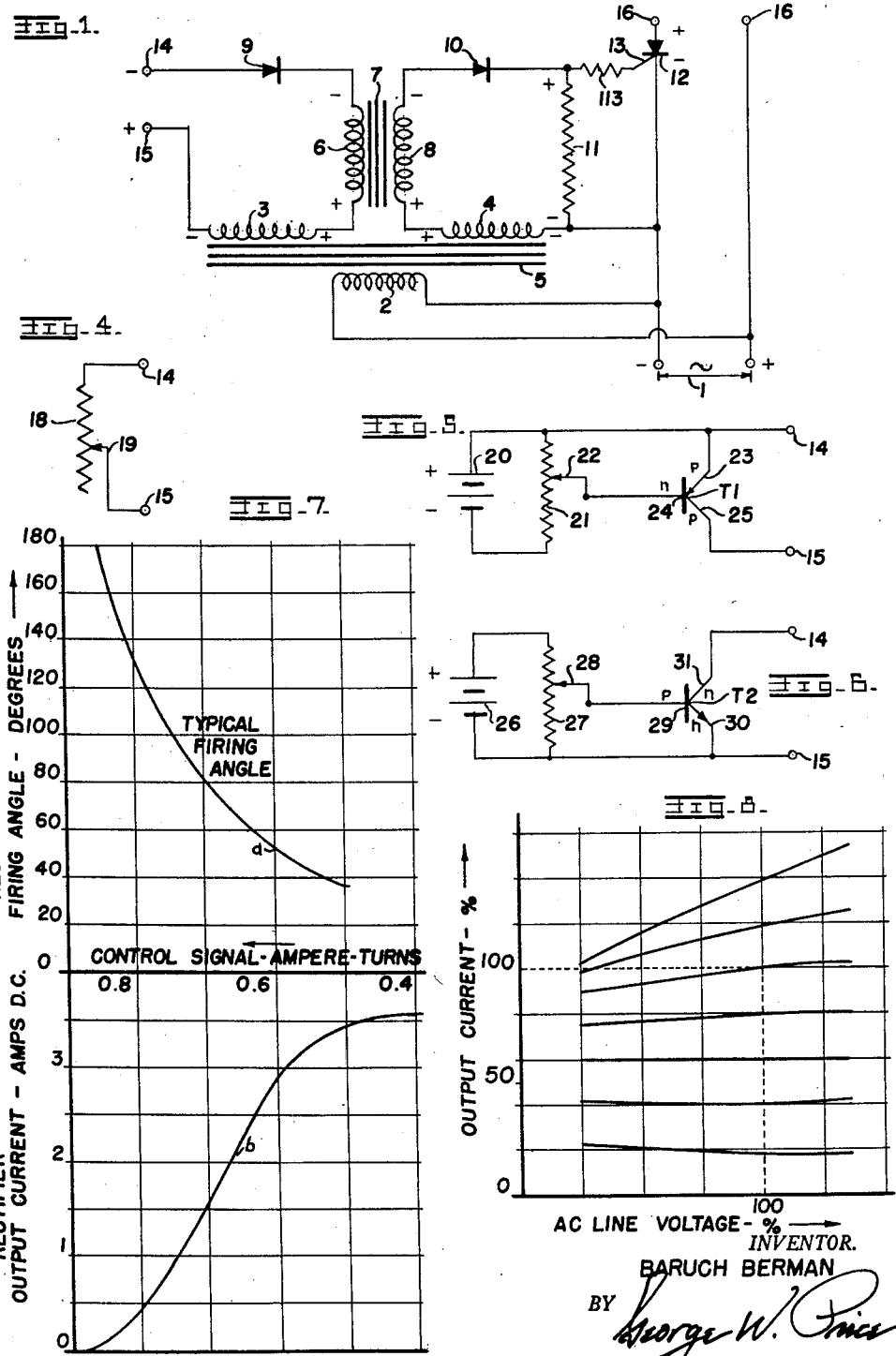

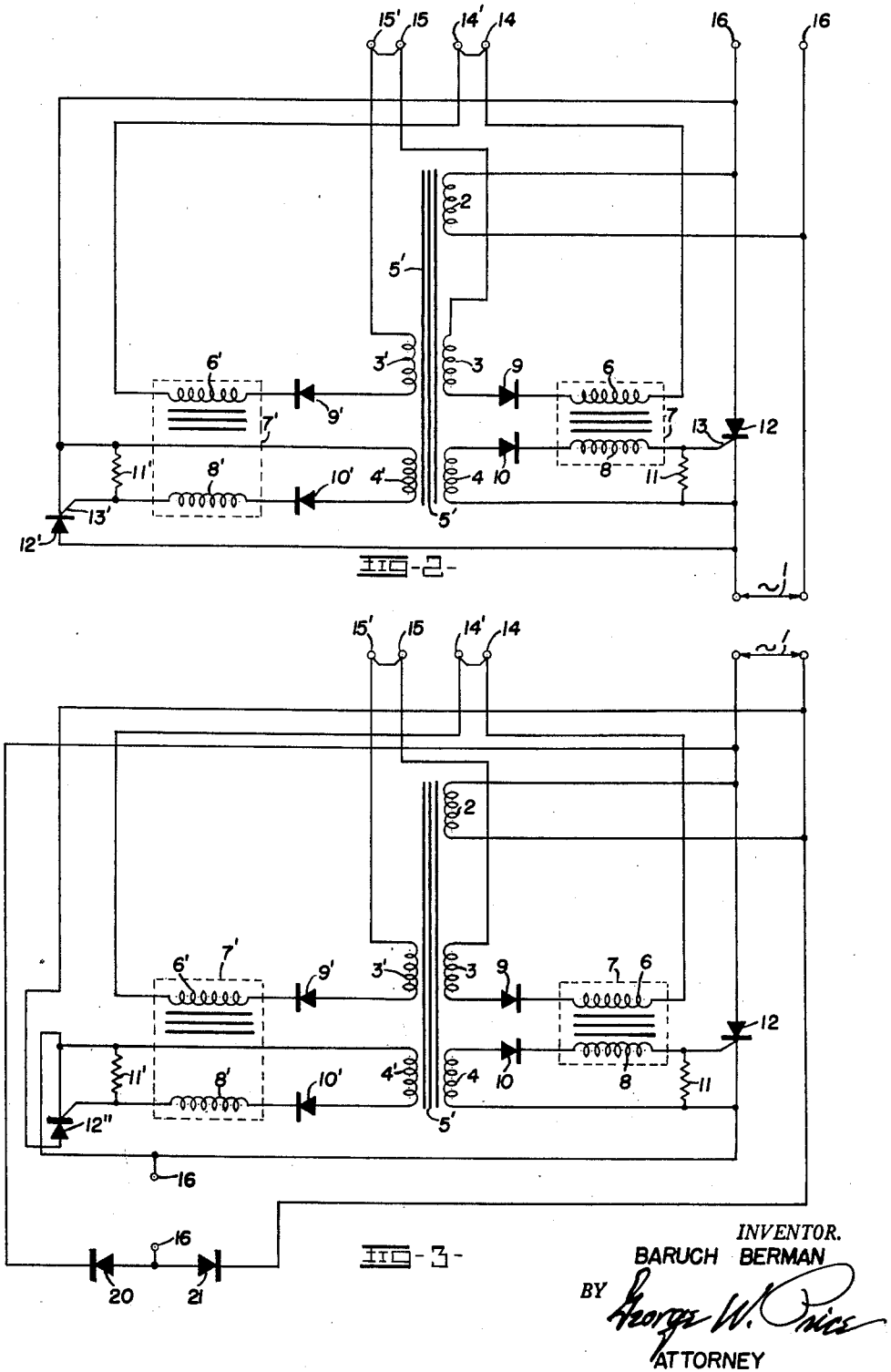

2,925,546

MAGNETIC RESET CONTROL FOR RECTIFIER

Baruch Berman, River Vale, N.J., assignor to ACF Industries, Incorporated, New York, N.Y., a corporation of New Jersey Application May 11, 1959, Serial No. 812,491

6 Claims. (Cl. 321—25)

My invention relates to the control of the firing angle of silicon controlled rectifiers, and particularly to the use of reset type magnetic amplifiers to effect the control.

In magnetic amplifiers of the prior art, a control winding carrying unidirectional current has been employed to set the operating level of magnetic flux in the reactor core. To minimize the flow of alternating current induced in the control winding by the load current, substantial inductance must be put in series with the control winding specifically, in the half wave configuration. This, added to the already high inductance of the control winding, slows the response of the control circuit to control signals.

An important improvement in response characteristics resulted from the introduction of the reset type magnetic amplifier, such as that described in United States Letters Patent No. 2,783,315, issued on February 26, 1957, to R. A. Ramey. In this type of amplifier an alternating voltage is applied to both output and control windings; the positive half cycle to one, the negative to the other. By limiting the voltage in each half wave to that just sufficient alternately to drive the core to saturation in opposite directions, the impedance of the output winding is maintained at a high value. The core magnetization due to the voltage impressed upon the output winding during the first half cycle is then said to be completely "reset" during the subsequent half cycle by the voltage impressed on the control winding. If this balance is upset, as by a further limiting of the voltage impressed on the control winding, the reset action will be reduced and the next cycle through the power winding will drive the core beyond saturation during part of the cycle. Once the core is saturated, the impedance of the power winding is sharply reduced, and the output voltage is correspondingly increased. By impressing this output voltage upon the control electrode of a rectifier such as of the silicon controlled type, the phase angle at which conduction of the rectifier commences can be varied directly as the output voltage is varied. As the output of the rectifier is responsive to the control only a single half cycle preceding; the response, known as single cycle response, is extremely rapid as compared to that for the usual magnetic amplifier systems.

With the use of high remanence nickel alloy cores, saturation is reached abruptly and as a result, conduction of the output winding will commence sharply or with a steep wave front. This characteristic is ideal for precise time phasing of many triggered rectifiers, such as a thyratron or solid state control device. For although the variation in power output of the reactor may be used for control of a linear load, the use of a triggered rectifier isolates the load from the reactor circuitry, thereby improving the regulation characteristics and output capability of the system as a power source.

It is thus an object of this invention to provide an improved variable output power supply utilizing a self-saturating, reset control, magnetic amplifier to gate a controlled rectifier.

A further object is to provide a power source in which the output level is substantially independent of line voltage and frequency variation over a considerable range of output level.

It is another object to provide a system having a wide range of controlled output and high power amplification.

Yet another object of the invention is to establish complete isolation between the power output and the control signal.

These and further objects of the invention will become apparent from the following detailed description which is illustrated by the drawings, in which:

Fig. 1 is a diagrammatic view showing the basic circuit of an embodiment of this invention having a half wave output;

Fig. 2 is a diagrammatic view of a second embodiment incorporating a full wave circuit with an alternating output;

Fig. 3 is a diagrammatic view of a third embodiment incorporating a full wave circuit with a direct output;

Fig. 4 is a view of one circuit for varying the input control signal using a variable resistor;

Figs. 5 and 6 are views showing alternate circuits for input signal control which incorporate transistors;

Fig. 7 is a graph illustrating typical rectifier output characteristics of firing angle and output current of a D.C. power supply as a function of control signal ampere turns; and Fig. 8 is a graph indicating percent of rectifier output current as a function of percent of line voltage.

In its preferred reduction to practice, the present invention requires an extremely modest array of components, these shown in Fig. 1 to consist of an isolation a step-down transformer 5, a saturable reactor 7, rectifiers 9 and 10, preferably of the solid state configuration, a load resistor 11, and a controlled rectifier 12, preferably of a commercially available silicon controlled type, such as General Electric Company type C35B, which conducts when a positive voltage is applied to its gate electrode 13. The core of reactor 7 is preferably of a high remanence material such as obtained with various commercially available nickel alloy steels such as are well known in the art. Power from a suitable source of alternating current 1 is applied to the primary winding 2 of transformer 5. One of the two secondary windings, designated 3, is connected in a control circuit series with a control winding 6 of reactor 7, the rectifier 9, and a control impedance circuit interposed between terminals 14 and 15, several types of which are described in detail below. The other transformer secondary winding 4 is connected in a load circuit in series with the power winding 8 of the reactor 7, the rectifier 10, and a load impedance such as the resistor 11. Polarity signs have been included in Fig. 1 to represent those occurring during a power output half cycle $E_o$ of line alternation of the power source 1; during the opposite half cycle each sign is obviously reversed.

During the power output half cycle indicated by the polarity signs, current flow through the control circuit and the transformer secondary winding 3 is prevented by the negatively biased rectifier 9. The flow of current through the other transformer secondary winding 4, is limited by the impedance of reactor power winding 8 and the load resistor 11. The residual level of the magnetic flux in the core of the saturable reactor 7 remaining from the previous (or reset) cycle determines the voltage-time integral in the winding 8 required to saturate the core. The magnetizing current level required will also increase as a function of the rectifier leakage current and the hysteresis loop width of the magnetic core material, both of which are preferably minimized. Once saturation of the core of the reactor 7 is reached, the effective impedance of its power winding 8 is immediately reduced with the result that current flows in a direction indicated by the polarity signs through the rectifier 10 and the load bleeder resistance 11. This impresses a positive voltage upon the gate electrode 13 of a silicon controlled rectifier 12 and an attenuator resistance 113.

When this positive signal or tripping voltage exceeds a minimum value which is characteristic of the particular rectifier being used, the rectifier is conductive in a forward direction.

During the succeeding (or reset) half cycle of the power source 1, essentially no current flows through the reactor power winding 8 because of the opposing polarity of the rectifier 10 so that the degree of flux reversal to be entirely controlled by the reactor control winding 6. The reverse or reset voltage obtained from the transformer secondary winding 3 is at first limited largely by the control impedance inserted between terminals 15 and 14 until the core is no longer saturated whereupon the reactor winding 6 will also have significant impedance. The extent to which the magnetization level is reversed is, therefore, directly dependent upon the value of impedance inserted between terminals 15 and 14. Since the degree of reversal, or reset, determines the phase angle of conduction on the subsequent power cycle, the power cycle current, as well as its angle, are also directly dependent upon the inserted impedance.

It is within the scope of this invention to control the impedance inserted between terminals 15 and 14 by various means. For example, in Fig. 4, the inserted impedance is controlled by a simple variable resistance such as a rheostat 18, the impedance value of which is selected by the adjustment of its slide tap 19. An alternative and more elaborate circuit for controlling the inserted impedance is shown in Fig. 5 where terminals 15 and 14 are connected respectively to the collector 25 and the emitter 23 of a p-n-p transistor T1. The impedance between the terminals 14 and 15 is varied by changing the magnitude of the positive control voltage applied between the emitter 23 and the transistor base 24. This control voltage is obtained from a direct current power supply such as battery 20 connected across a voltage dividing resistor 21 having a movable tap 22. It will be apparent to those skilled in the art that an electrical signal may be applied directly between emitter 23 and base 24 to control the gate signal, thus permitting remote control of the unit or its use in the servo feedback loop. The control impedance may also be varied with a n-p-n transistor connected as shown in Fig. 6 wherein the terminal 15 is connected to the emitter 30 and the terminal 14 to the collector 31. The control voltage from a battery 26 or other direct power source is applied between the transistor base 29 and the emitter 30 through the movable tap 28 of a parallel voltage dividing resistor 27.

As the impedance inserted between terminals 15 and 14 is varied, as in any of the above described circuits, the phase of the half wave rectified voltage pulses appearing across load resistor 11 is caused to vary over a wide range. Typical response characteristics for a circuit such as shown in Fig. 1 are illustrated in Fig. 7, wherein line $a$ represents the firing or phase angle of the leading edge of the voltage pulse. The control signal is expressed in terms of ampere turns of the negative magnetizing current flowing through the turns of the reactor winding 6 in the control circuit, the negative half cycle being used here in the sense indicating that the positive half cycle appears at the output side. Decreasing the control resistance between terminals 15 and 14 increases the negative current, which in turn increases the extent to which the core magnetization is reset. Correspondingly, conduction in the output will commence at progressively later, i.e., increasing values of phase angle.

As mentioned above, the controlled rectifier 12 will be triggered when the positive gate voltage exceeds the required minimum level. As indicated by the polarity signs of Fig. 1, alternating voltage from the power source 1 is applied across this rectifier 12 in the same polarity and phase as the secondary voltage appearing across winding 4 of the stepdown isolation transformer 5. It will be evident from a comparison of the curves $a$ and $b$ of Fig. 7 that the rectified output current at terminal 16 may be controlled over a range corresponding to and in a manner inversely similar to the phase angle variation of the rectifier 12. The resulting relationship of output current to input control voltage may thus be seen to be of a form quite suitable for control purposes, and obviously superior to the output characteristics of the magnetic amplifier alone.

When the above described system is used to control a D.C. power supply system, the rectified output current remains relatively constant with substantial variation in line voltage as will be evident from Fig. 8, which illustrate experimentally measured values of these parameters for various settings of the control circuit resistance. It will be noted that at approximately 50 percent of maximum output, the regulation curve is substantially flat. Below this value the output curves are still relatively flat but tend to have a slight negative slope. At higher output levels the curve slopes become positive and at saturation the load current follows the line voltage as is to be expected. It will also be noted that the superior performance characteristics shown in Fig. 8 are obtained with the simple combination of circuit elements here described. The system also has the important advantage of being inherently self compensating without the complexity of closed loop feedback compensation networks which have been a necessary part of many systems of the prior art. It has been found experimentally that the above described voltage regulation characteristics can be obtained when the supply line voltage is allowed to vary from 85 v. to 135 v. A.C., R.M.S., an allowance range greater than that expected on supply lines having the poorest possible regulation characteristics.

While for simplicity of explanation the system has been described for half wave operation, it will be apparent to one skilled in the art that two such control circuits can be employed to obtain a full wave output. One such circuit having a controlled alternating current output is shown in Fig. 2, wherein the controlled rectifier 12 and the control circuit elements therefor are identified by the same numerals as the corresponding elements in Fig. 1 and function in a similar manner to that set forth heretofore. To permit full wave alternating current operation, a second controlled rectifier 12' is connected in parallel with the rectifier 12 but in opposed polarity. The elements of the control circuit for the rectifier 12' are distinguished in Fig. 2 by the use of primed numerals which correspond to the numerals of the similar elements in the control circuit for rectifier 12. Control impedance terminals 14—14' and 15—15', respectively, are connected by jumpers and a single control impedance circuit such as those shown in Figs. 4, 5 or 6 is interposed between terminals 14' and 15 to control both rectifiers 12 and 12' conjointly. It has also been found to be more convenient to use a single transformer 5' having four secondary windings 3, 4, 3' and 4' rather than providing two separate stepdown transformers for the two control circuits.

The embodiment shown in Fig. 3, which is an arrangement for providing a unidirectional output at the terminals 16, is generally similar in construction and operation to the full wave circuit in Fig. 2, described above. This embodiment includes the control rectifier 12" and the additional rectifiers 20 and 21 providing the unidirectional output.

The circuits shown in Figs. 1, 2 and 3 may be conveniently packaged in one compact assembly as a building block. It will also be evident to one skilled in the art that the above circuits can be readily engineered into a variety of control circuits designed to cover a multitude of functions, such as position controllers and indicators, speed control of A.C. and D.C. motors, voltage control of line and voltage control of generators, whether A.C. or D.C. lighting and illumination control, power supplies, halfwave and full wave switches for A.C. and D.C., current regulators and various servo amplifications. A most important inherent advantage of the above described systems incorporating my invention is that these systems will operate without any modification or adjustment at any frequency between 40 and 500 cycles per second, a frequency range which includes 400 cycle operating frequency used in many airborne, shipboard, and laboratory power supplies.

What I claim is:

1. In a controlled rectifier system, a solid state rectifier having a cathode, an anode and a control electrode, a load circuit, a source of alternating voltage connected in series with said rectifier cathode to anode elements and said load, means for applying a gating signal to said control electrode of amplitude sufficient to initiate conduction and of phasing controllably variable with respect to that of said source, said gating means including a saturable magnetic core, first and second windings on said core, means for impressing said source of alternating voltage in series with said first and said second windings, rectifying means in series with each winding operative to drive the core toward saturation in one direction during one half cycle and in the opposite direction during the next half cycle, means for limiting the voltage impressed on said first winding, a resistance connected in parallel with said second winding, and means for connecting one end of said resistor to said control electrode and the other end to said cathode.

2. In a controlled rectifier system, a solid state rectifier having a cathode, an anode and a control electrode, a load circuit, a source of alternating voltage connected in series with said rectifier cathode to anode elements and said load, means for applying a gating signal to said control electrode of amplitude sufficient to initiate conduction and of phasing controllably variable with respect to that of said source, said gating means including a high remanence saturable magnetic core, first and second windings on said core, means for impressing said source of alternating voltage in series with said first and said second windings, rectifying means in series with each winding operative to drive the core toward saturation in one direction during one half cycle and in the opposite direction during the next half cycle, means for limiting the impressed voltage on said first winding, a resistance connected in parallel with said second winding, and means for connecting one end of said resistor to said control electrode and the other end to said cathode.

3. In a controlled rectifier system, a solid state rectifier having a cathode, an anode and a control electrode, a load circuit, a source of alternating voltage connected in series with said rectifier cathode to anode elements and said load, means for applying a gating signal to said control electrode of amplitude sufficient to initiate conduction and of phasing controllably variable with respect to that of said source, said gating means including a saturable magnetic core, first and second windings on said core, means for impressing said source of alternating voltage in series with said first and said second windings, silicon diodes in series with each winding operative to drive the core toward saturation in one direction during one half cycle and in the opposite direction during the next half cycle, means for limiting the impressed voltage on said first winding, a resistance connected in parallel with said second winding, and means for connecting one end of said resistor to said control electrode and the other end to said cathode.

4. In a controlled rectifier system, a solid state rectifier having a cathode, an anode and a control electrode, a load circuit, a source of alternating voltage connected in series with said rectifier cathode to anode elements and said load, means for applying a gating signal to said control electrode of amplitude sufficient to initiate conduction and of phasing controllably variable with respect to that of said source, said gating means including a saturable magnetic core, first and second windings on said core, means for impressing said source of alternating voltage in series with said first and said second windings, rectifying means in series with each winding operative to drive the core toward saturation in one direction during one half cycle and in the opposite direction during the next half cycle, a transistor for limiting the voltage impressed on said first winding, a resistance connected in parallel with said second winding, and means for connecting one end of said resistor to said control electrode and the other end to said cathode.

5. In a controlled rectifier system, a solid state rectifier having a cathode, an anode and a control electrode, a load circuit, a source of alternating voltage connected in series with said rectifier cathode to anode elements and said load, means for applying a gating signal to said control electrode of amplitude sufficient to initiate conduction and of phasing controllably variable with respect to that of said source, said gating means including a saturable magnetic core, first and second windings on said core, means for impressing said source of alternating voltage in series with said first and said second windings, rectifying means in series with each winding operative to drive the core toward saturation in one direction during one half cycle and in the opposite direction during the next half cycle, means for limiting the impressed voltage on said first winding, a load impedance connected in parallel with said second winding, and means for connecting one end of said load impedance to said control electrode and the other end to said cathode.

6. In a controlled rectifier system, a solid state rectifier having a cathode, an anode and a control electrode, a load circuit, a source of alternating voltage connected in series with said rectifier cathode to anode elements and said load, means for applying gating power to said control electrode of amplitude sufficient to initiate conduction and of phasing controllably variable with respect to that of said source, said gating means including a saturable magnetic core, first and second windings on said core, means for impressing said source of alternating voltage in series with said first and said second windings, rectifying means in series with each winding operative to drive the core toward saturation in one direction during one half cycle and in the opposite direction during the next half cycle, a variable resistance for limiting the impressed voltage on said first winding, a resistance connected in parallel with said second winding, and means for connecting one end of said resistor to said control electrode and the other end to said cathode.

References Cited in the file of this patent
UNITED STATES PATENTS

| | | |
|---|---|---|
| 2,786,966 | Taylor | Mar. 26, 1957 |
| 2,786,967 | Kuenning | Mar. 26, 1957 |